US010252402B2

(12) United States Patent

Fujisawa et al.

(10) Patent No.: US 10,252,402 B2
(45) Date of Patent: Apr. 9, 2019

(54) IMPACT FASTENING TOOL AND TORQUE TESTER

(71) Applicants: YOKOTA INDUSTRIAL CO., LTD., Osaka (JP); KYOEI ELECTRIC CO., LTD., Osaka (JP)

(72) Inventors: Kentarou Fujisawa, Osaka (JP); Hiroaki Inamori, Osaka (JP)

(73) Assignee: YOKOTA INDUSTRIAL CO., LTD., Osaka (JP)

( * ) Notice: Subject to any disclaimer, the term of this patent is extended or adjusted under 35 U.S.C. 154(b) by 159 days.

(21) Appl. No.: 15/505,300

(22) PCT Filed: Sep. 3, 2014

(86) PCT No.: PCT/JP2014/073139

§ 371 (c)(1),
(2) Date: Feb. 21, 2017

(87) PCT Pub. No.: WO2016/035157

PCT Pub. Date: Mar. 10, 2016

(65) Prior Publication Data

US 2017/0266788 A1 Sep. 21, 2017

(51) Int. Cl.

*B25B 21/02* (2006.01)
*B25B 23/147* (2006.01)
*B25B 23/145* (2006.01)

(Continued)

(52) U.S. Cl.

CPC .......... *B25B 21/02* (2013.01); *B25B 23/1453* (2013.01); *B25B 23/1456* (2013.01);

(Continued)

(58) Field of Classification Search

CPC ............ B25B 23/1453; B25B 23/1456; B25B 23/1475; B25B 21/02; H01R 39/24; H01R 39/64

(Continued)

(56) References Cited

U.S. PATENT DOCUMENTS 3,959,679 A * 5/1976 Buckley ................. H01R 39/18 310/232
RE32,805 E * 12/1988 Engelmore ............ H01R 39/64 439/24

(Continued)

FOREIGN PATENT DOCUMENTS

DE 4042270 C1 4/1992
DE 19718912 A1 11/1997

(Continued)

OTHER PUBLICATIONS

European Search Report dated Mar. 28, 2018 issued for corresponding European application No. 14901051.4.

(Continued)

*Primary Examiner* — Hadi Shakeri
(74) *Attorney, Agent, or Firm* — Heslin Rothenberg Farley & Mesiti P.C.

(57) ABSTRACT

Provided are: an impact fastening tool which prevents a torque detector from missing a signal and extends service life by adopting a fixed connector that prevents the trouble of being instantaneously separated (bounced) from a rotating electrode by intermittent impacts and has a shape allowing the progression of friction to be delayed structurally; and a torque tester. Both end portions of the fixed connector are fixed, and at least two protrusion portions are formed between the both end portions. The rotating electrode is disposed between one protrusion portion and the other protrusion portion such that the rotating electrode contacts the fixed connector at two or more points or in a line form. A signal required for the torque detecting means is transmitted through the contact between the rotating electrode and the fixed connector.

2 Claims, 8 Drawing Sheets

(51) Int. Cl.
*H01R 39/24* (2006.01)
*H01R 39/64* (2006.01)

(52) U.S. Cl.
CPC ......... *B25B 23/1475* (2013.01); *H01R 39/24* (2013.01); *H01R 39/64* (2013.01)

(58) Field of Classification Search
USPC ............................................................ 81/464
See application file for complete search history.

(56) References Cited

U.S. PATENT DOCUMENTS

| | | | | |
|---|---|---|---|---|
| 5,846,090 A * | 12/1998 | Lu | H01R 39/64 | 439/26 |
| 6,595,782 B1 * | 7/2003 | Hsiao | H01R 39/64 | 439/13 |
| 7,719,158 B2 * | 5/2010 | Angerpointner | H01R 39/24 | 310/239 |
| 7,750,493 B2 * | 7/2010 | Cairo | F03D 7/0224 | 290/55 |

FOREIGN PATENT DOCUMENTS

| | | | |
|---|---|---|---|
| EP | 2719503 | A2 | 4/2014 |
| JP | 58-45529 | | 3/1983 |
| JP | 614676 | A | 1/1986 |
| JP | 5-228850 | A | 9/1993 |
| JP | 8-504269 | A | 5/1996 |
| JP | 2014-079817 | | 12/2015 |
| WO | 1994/07119 | | 3/1994 |
| WO | 2013/168355 | A1 | 11/2013 |

OTHER PUBLICATIONS

International Search Report issued in PCT/JP2014/073139, dated Nov. 18, 2014.

* cited by examiner

PRIOR ART

PRIOR ART

PRIOR ART

IMPACT FASTENING TOOL AND TORQUE TESTER

CROSS REFERENCE TO RELATED APPLICATIONS

This application is the National Phase filing under 35 U.S.C. § 371 of International Application No. PCT/JP2014/073139, filed on Sep. 3, 2014, and published on Mar. 10, 2016 as WO2016/035157 A1. The contents of which is hereby incorporated by reference herein in its entirety.

BACKGROUND ART

The present invention relates to an impact fastening tool including a torque detection means, and a torque tester.

An impact fastening tool is designed to automatically stop its driving part, when a tightening torque for a screw such as a bolt and a nut reaches a set value.

The tightening torque as the set value is detected by attaching a sensor to a rotating portion (e.g., attaching a strain gauge to a main shaft), and transmitting a signal from the rotating portion to the non-rotary housing side. An example of the means for transmitting the signal is a contact point that is allowed to rotate by adopting a slip ring portion, as disclosed in Japanese Patent Laid-Open No. 2014-79817.

However, since the impact fastening tool generates intermittent impacts, the impact fastening tool using the slip ring portion has a problem that the intermittent impacts momentarily separate (bounce) a fixed connector using a brush, wire, or other parts from a rotating electrode. Since this interrupts signal transmission, a torque detection means misses a signal. Then, as shown in FIG. 8, if a force F is increased to press a brush B, which is the fixed connector, against the rotating electrode to prevent the aforementioned bouncing, the brush B and rotating electrode 4 abrade quickly and service life is reduced. This is because only one end of the brush B is fixed, as shown in FIGS. 8 and 9.

Another impact fastening tool, as disclosed in Japanese Patent Laid-Open No. 61-4676, includes multiple coils to form rotary transformers, so that nothing comes into contact with a rotating portion. However, the impact fastening tool including the rotary transformers requires multiple coils, and is therefore large, heavy, has many parts, and has a problem that the impact may break the coil.

SUMMARY OF INVENTION

Technical Problem

In view of the foregoing, the present invention provides: an impact fastening tool which prevents a torque detection means from missing a signal (prevents interruption of signal transmission) and extends service life, by adopting a fixed connector that prevents the trouble that a brush B is momentarily separated (bounced) from a rotating electrode and has a structure that slows abrasion; and a torque tester.

Solution to Problem

To achieve the above objective, the present invention employs the following solutions.

An impact fastening tool is provided for converting a rotary force of a rotary drive source into intermittent impacts by an impact generation mechanism, and fastening a screw by a rotary force of a main shaft applied by the impact force, the impact fastening tool including: a housing; a slip ring portion; and a torque detection means that detects a tightening torque, characterized in that: the slip ring portion includes a rotating electrode that rotates integrally with the main shaft, and a fixed connector that is in contact with the rotating electrode; both end portions of the fixed connector are fixed, and at least two protrusion portions are formed between the both end portions; the rotating electrode is disposed between one protrusion portion and the other protrusion portion such that the rotating electrode contacts the fixed connector at two or more points or in a line form; and a signal required for the torque detection means is transmitted through the slip ring portion.

In the impact fastening tool a part between the top of one protrusion portion and the top of the other protrusion portion is a valley portion; a curvature of the valley portion is smaller than a curvature of the rotating electrode; and two contact points are formed between the rotating electrode and the fixed connector.

Also provided is a torque tester for measuring a tightening torque of a fastening tool, comprising: a housing; a shaft receiving portion that receives a main shaft of the fastening tool; a slip ring portion; and a torque detection means that detects a tightening torque, characterized in that: the slip ring portion includes a rotating electrode that rotates integrally with the shaft receiving portion, and a fixed connector that is fixed and in contact with the rotating electrode; both end portions of the fixed connector are fixed, and at least two protrusion portions are formed between the both end portions; the rotating electrode is disposed between one protrusion portion and the other protrusion portion such that the rotating electrode contacts the fixed connector at two or more points or in a line form; and a signal required for the torque detection means is transmitted through the slip ring portion.

Advantageous Effects of Invention

According to one aspect of the invention, the rotating electrode is pressed lightly against the fixed connector, between both of the protrusion portions of the fixed connector. Hence, even if intermittent impacts cause the rotating electrode of the fixed connector to sway due to vibration of the rotating electrode, deflection of the whole fixed connector can absorb the swaying motion. Additionally, when a force that detaches one contact point of the fixed connector from the rotating electrode is applied on the one contact point, a force headed toward the rotating electrode is generated in the other contact point. Accordingly, the fixed connector prevents the trouble of being momentarily separated (bounced) from the rotating electrode. As a result, the impact fastening tool adopting this fixed connector prevents interruption of signal transmission from the rotating portion to the housing side, and prevents the torque detection means from missing a signal.

Moreover, since the fixed connector has a structure that slows abrasion, the impact fastening tool adopting this fixed connector extends service life.

DESCRIPTION OF EMBODIMENTS

Hereinafter, the impact fastening tool and the torque tester will be described with reference to the drawings illustrated as embodiments.

Embodiment 1

[1. Basic Configuration of Impact Fastening Tool 1]

Figure 1:
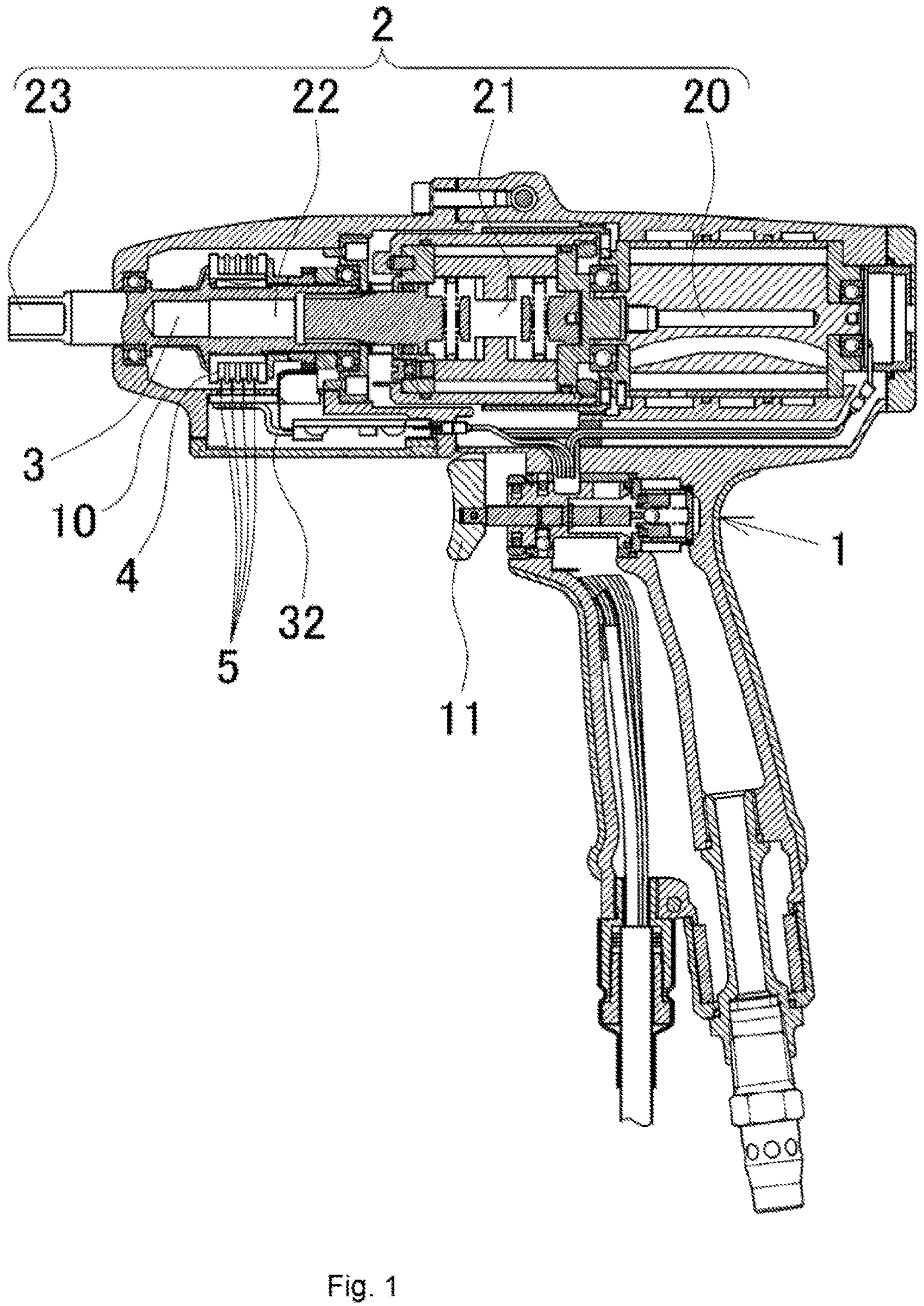
FIG. 1 is an overall cross-sectional view of an impact fastening tool.
Figure 2:
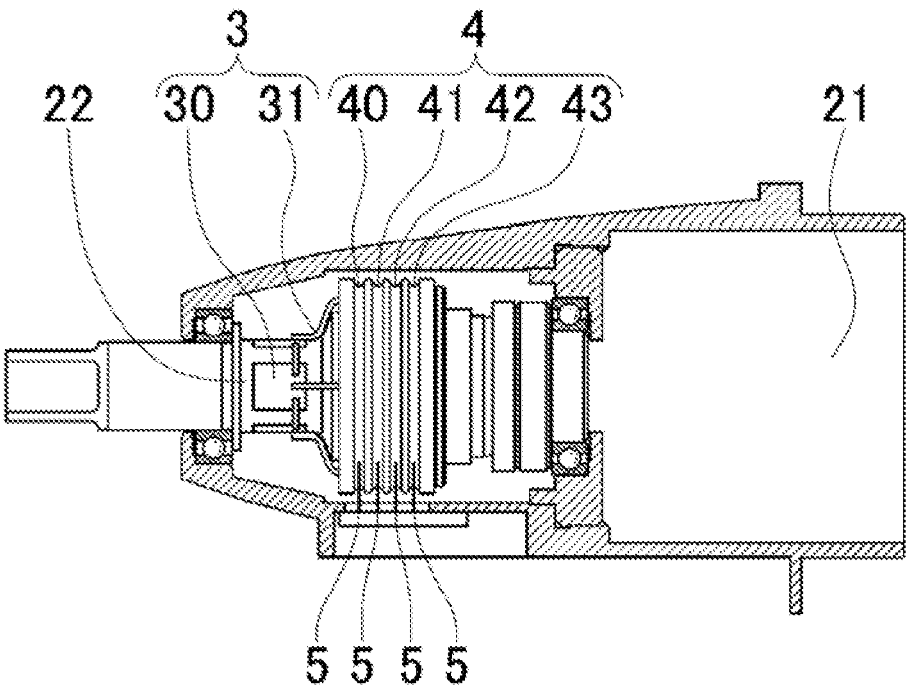
FIG. 2 is an enlarged cross-sectional view of a part of the impact fastening tool.
Figure 3:
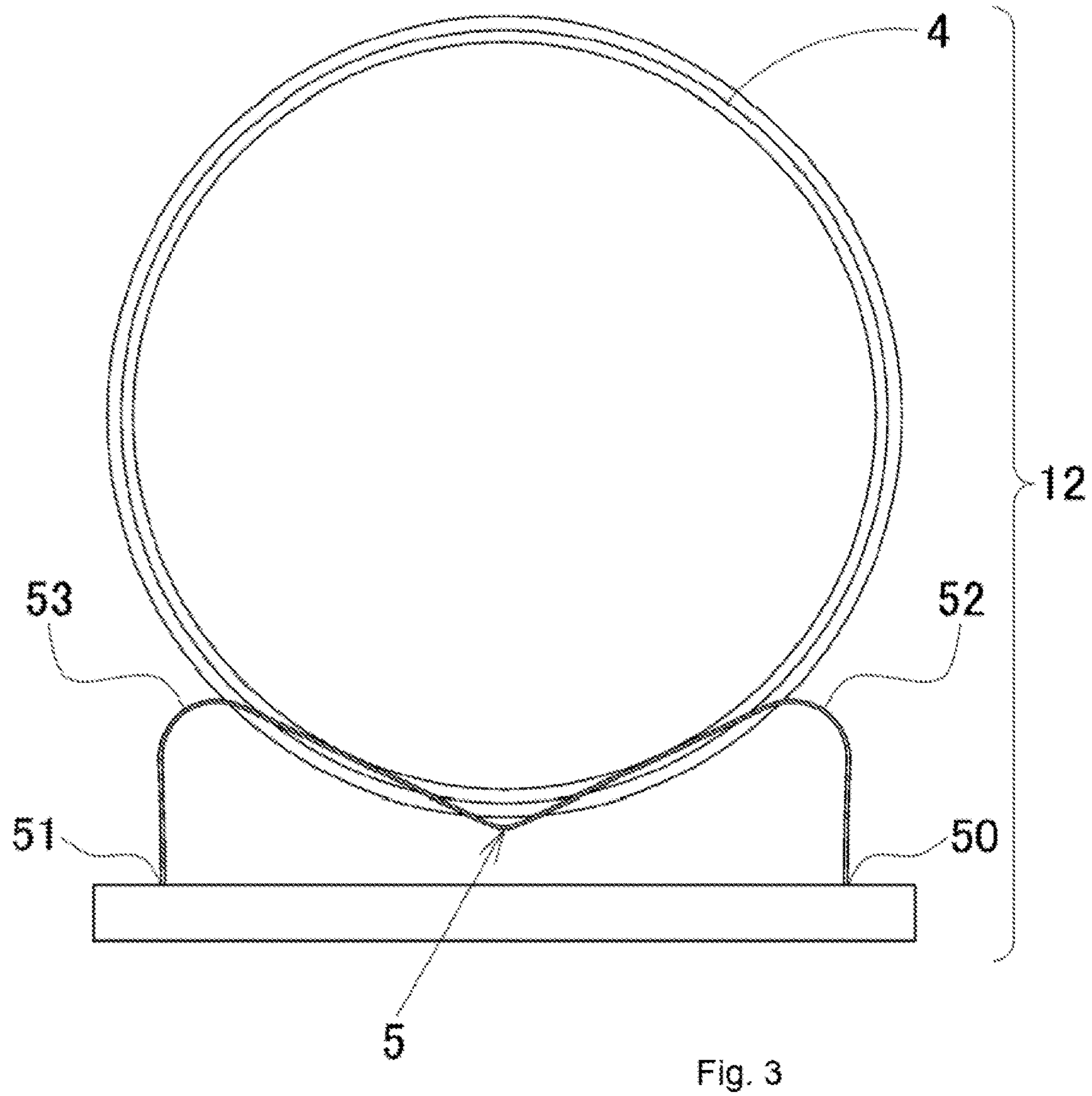
FIG. 3 is a cross-sectional view of a rotating electrode of FIG. 2.
Figure 4:
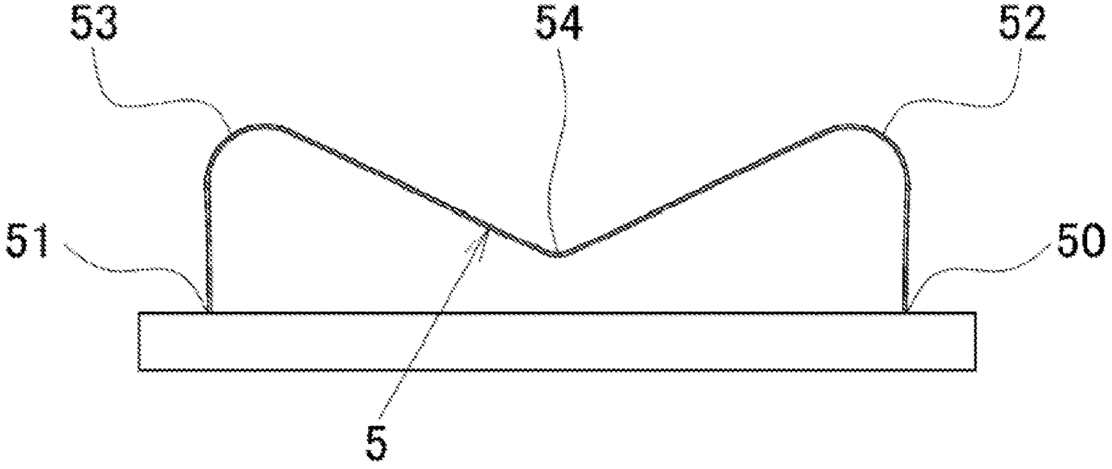
FIG. 4 is an overall view of a fixed connector.

FIG. 1 is an overall cross-sectional view of an impact fastening tool 1. FIG. 2 is an enlarged cross-sectional view of a part of the impact fastening tool 1. FIG. 3 is a cross-sectional view of a rotating electrode 4 of FIG. 2. FIG. 4 is an overall view of a fixed connector 5.

As shown in FIG. 1, the impact fastening tool 1 includes a housing 10, a trigger 11, a slip ring portion 12, a rotating portion 2, and a torque detection means 3. When a user pulls the trigger 11, the rotating portion 2 converts a rotary force of a rotary drive source 20 into intermittent impacts by an impact generation mechanism 21, and a shaft end portion 23 fastens a screw by a rotary force of a main shaft 22 applied by the aforementioned impact force. Examples of the rotary drive source 20 include an air motor and an electric motor.

To be specific, the impact fastening tool 1 is referred to as an impulse wrench or an impact wrench.

[2. Torque Detection Means 3 and Slip Ring Portion 12]

The torque detection means 3 is configured to detect a tightening torque, and when a preset torque is detected on the basis of the detection, the impact fastening tool 1 does not perform fastening. An example of this process is to stop the rotating portion 2.

The slip ring portion 12 including the rotating electrode 4 and the fixed connector 5 shown in FIG. 3 transmits a signal required for the torque detection means 3.

To enable transmission of a signal as mentioned above, the rotating electrode 4 is provided on the outer periphery of the main shaft 22 and rotates integrally with the main shaft 22, while the fixed connector 5 is fixed to the non-rotary housing 10 side and is in contact with the rotating electrode 4, as shown in FIGS. 1 to 3. Hence, a signal required for the torque detection means 3 can be transmitted through the contact between the rotating electrode 4 and the fixed connector 5.

Signal transmission of the torque detection means 3 will be described in more detail. As shown in FIG. 2, a strain gauge 30 is attached to the main shaft 22. A signal from the strain gauge 30 is transmitted by passing through wiring 31 from the strain gauge 30 to the rotating electrode 4, through the contact between the rotating electrode 4 and the fixed connector 5, and through wiring 32 on the housing 10 side. Then, the torque detection means 3 detects torque on the basis of the transmitted signal. It is preferable that the signal be transmitted from the strain gauge 30 to the housing 10 side by using DC. This is because if AC is used for torque detection, a circuit for rectifying AC to DC is required, and a circuit for detecting the phase difference between input and output is required to detect right and left of the rotation direction. On the other hand, since DC does not require rectification, and right and left of the rotation direction can be detected by voltage level alone, the circuit can be simplified. As a result, by detecting torque by a DC circuit, the impact fastening tool 1 can be reduced in size and weight.

[3. Rotating Electrode 4 and Fixed Connector 5]

As shown in FIG. 2, the rotating electrode 4 includes multiple grooves 40, 41, 42, and 43, and each of the grooves 40 to 43 is in contact with the fixed connector 5. The grooves 40 to 43 may each transmit a different signal, or multiple grooves may transmit the same signal.

As shown in FIGS. 3 and 4, both end portions 50, 51 of the fixed connector 5 are fixed, and at least two protrusion portions 52, 53 are formed between the both end portions 50, 51. Hence, the rotating electrode 4 is disposed between one protrusion portion 52 and the other protrusion portion 53 such that the rotating electrode 4 contacts the fixed connector 5 at two or more points or in a line form (line contact along a curve of a groove surface). With this contact, if a force that detaches one contact point (one end portion of the line contact) of the fixed connector 5 from the rotating electrode 4 is applied on the one contact point, a force headed toward the rotating electrode 4 is generated in the other contact point (the other end portion of the line contact).

Then, if a part between the top of one protrusion portion 52 and the top of the other protrusion portion 53 is formed into a valley portion 54, and the curvature of the valley portion 54 is smaller than the curvature of the rotating electrode 4, two contact points are formed, respectively, on either side of the valley portion 54. This can favorably improve abrasion resistance. As shown in FIGS. 3 and 4, two contact points can be obtained by forming the valley portion 54 into a bent portion. Additionally, although the fixed connector 5 can be formed into an asymmetrical shape, it is preferable that the protrusion portions 52, 53 be axially symmetric.

The shape of the fixed connector 5 is not limited to the substantial M shape shown in FIG. 4, and can be any shape as long as the one protrusion portion 52 and the other protrusion portion 53 hold the groove 40 of the rotating electrode 4. Hence, even if the rotating electrode 4 rotating together with the main shaft 22 vibrates violently, deflection of the fixed connector 5 can maintain energization without disconnecting the circuit. As a result, signal transmission from the rotating portion 2 to the housing 10 side is not interrupted, and signals from the torque detection means 3 are not missed.

Examples of the grooves 40 to 43 of the rotating electrode 4 include brass, a silver alloy, a gold alloy and the like formed into a ring shape, and examples of the material of the fixed connector 5 include carbon, a silver alloy, a gold alloy, a senary alloy and the like formed into a wire shape.

[4. Comparison with Conventional Technique and Effects of Present Invention]

Figure 7:
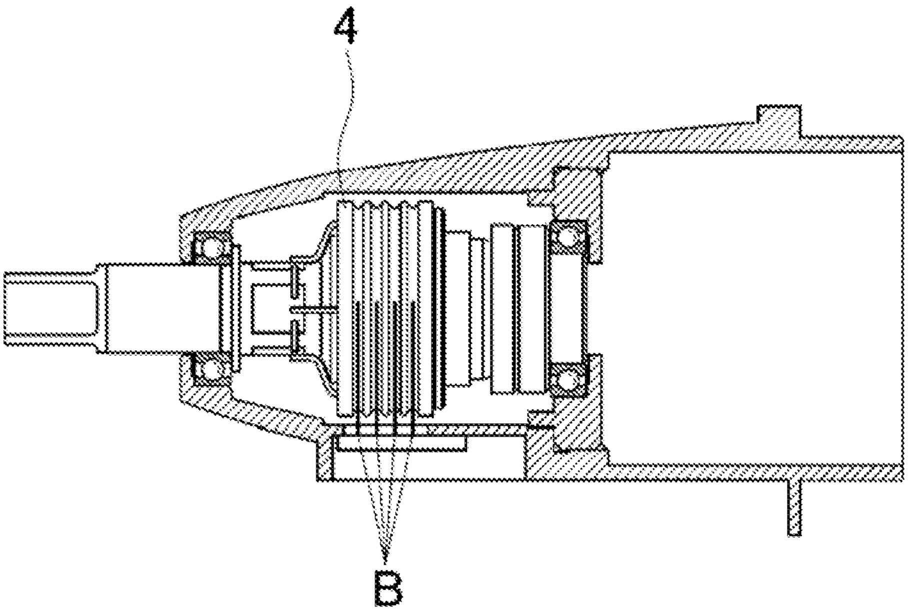
FIG. 7 is an enlarged cross-sectional view of a part of an impact fastening tool of a conventional technique.
Figure 8:
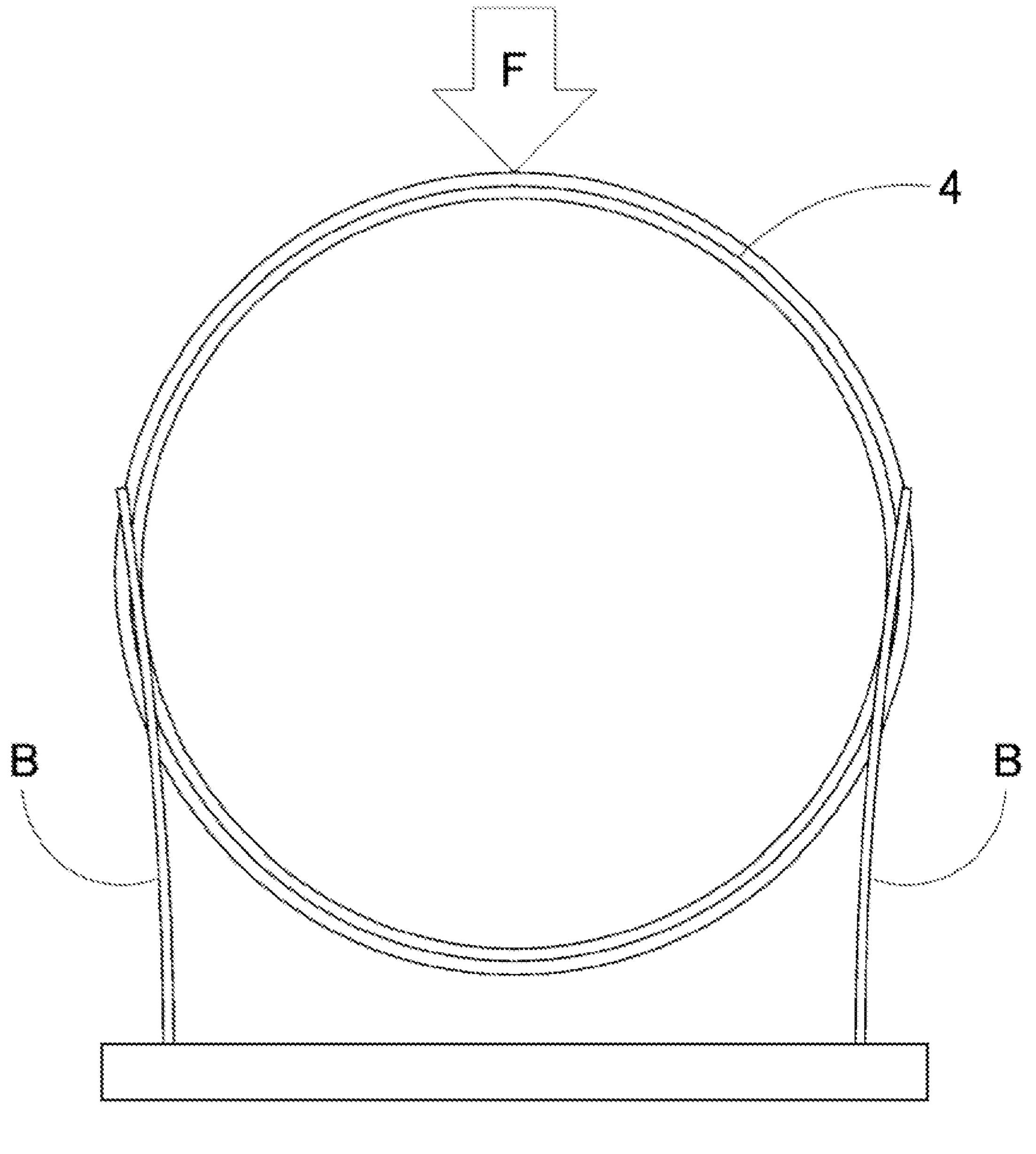
FIG. 8 is a cross-sectional view of a rotating electrode of FIG. 7.
Figure 9:
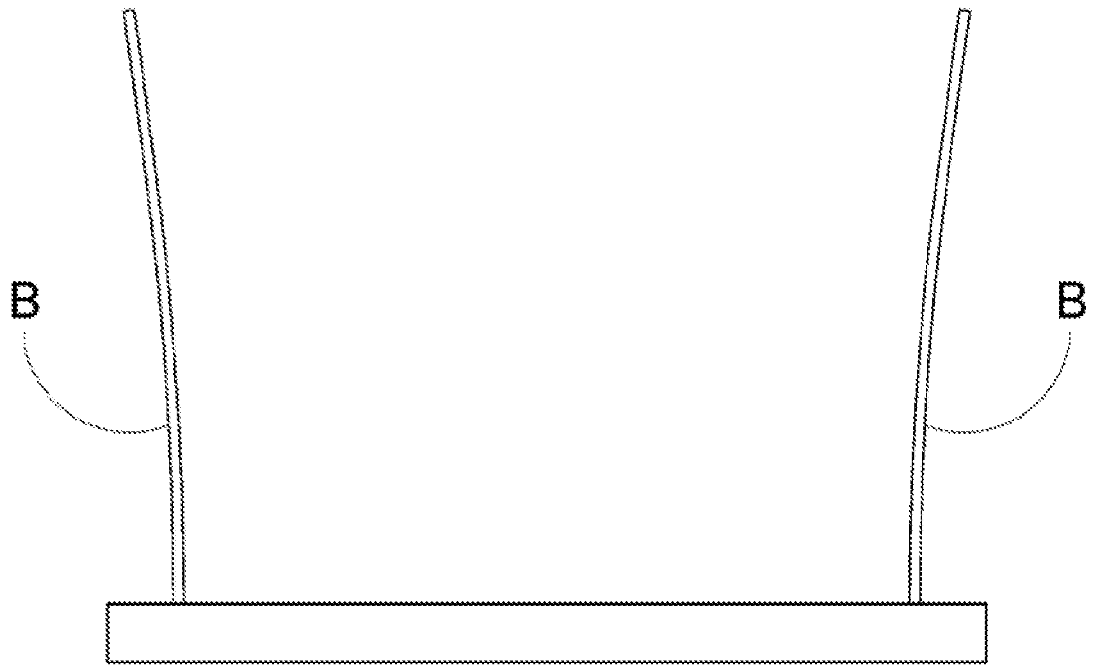
FIG. 9 is an overall view of a brush of the conventional technique.

FIG. 7 is an enlarged cross-sectional view of a part of an impact fastening tool of a conventional technique. FIG. 8 is a cross-sectional view of a rotating electrode 4 of FIG. 7. FIG. 9 is an overall view of a brush B of the conventional technique.

As shown in FIGS. 7 to 9, in the conventional technique, the brush B is pressed against the rotating electrode 4. Since an impact fastening tool 1 generates intermittent impacts, it has a characteristic problem that when the rotating electrode 4 is used, the intermittent impacts momentarily separate (bounce) the brush B from the rotating electrode 4. Meanwhile, if a force F is applied to the rotating electrode 4 in an arrow direction (see FIG. 8) such that the force pressing the brush B against the rotating electrode 4 is increased to prevent the aforementioned bouncing, the brush B and rotating electrode 4 abrade quickly and service life is reduced.

Abrasion and bouncing of the brush B and the rotating electrode 4 when applied large and small pressing forces F, were compared with abrasion and bouncing of the fixed connector 5 and the rotating electrode 4 of the present invention. The following Table 1 shows contents of the comparison.

TABLE 1

| | Abrasion resistance (wear resistance) | Bounce prevention (slosh resistance) |
|---|---|---|
| Conventional technique: large F (in PERIOR ART F is large) | x | o |
| Conventional technique: small F (in PERIOR ART F is small) | o | x |
| Present invention (THIS INVENTION) | o | o |

o: Good (Good)
x: Poor (Bad)

As shown in Table 1, the fixed connector 5 of the present invention prevents bouncing from the rotating electrode 4, and abrades slowly. Hence, the impact fastening tool 1 adopting the fixed connector 5 prevents the torque detection means 3 from missing a signal, and extends service life.

Embodiment 2

[5. Basic Configuration of Torque Tester 6]

Figure 5:
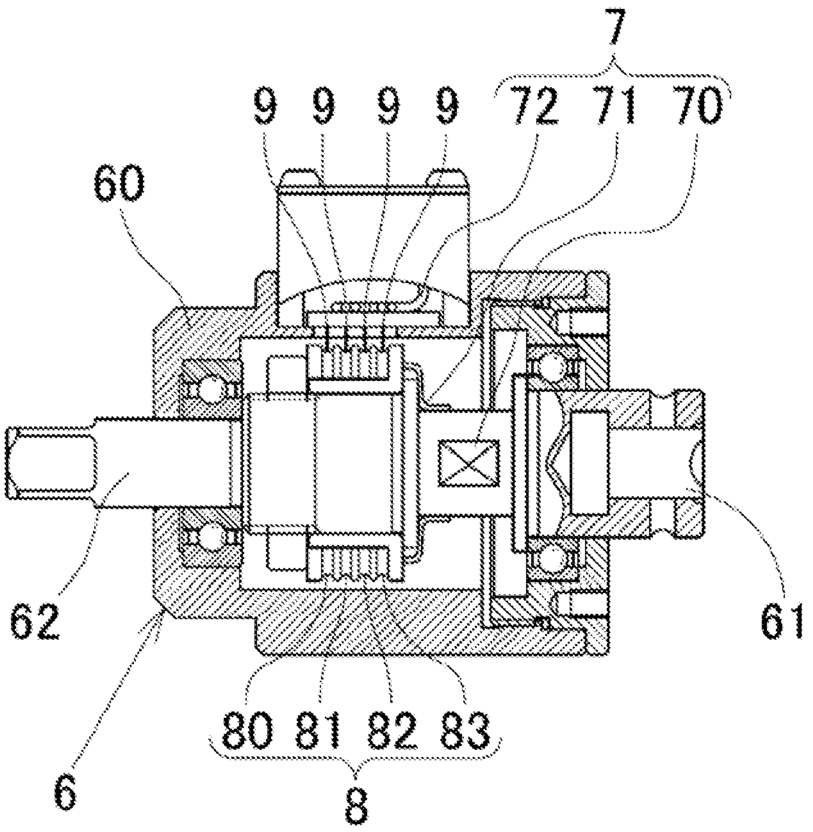
FIG. 5 is an overall cross-sectional view of a torque tester.
Figure 6:
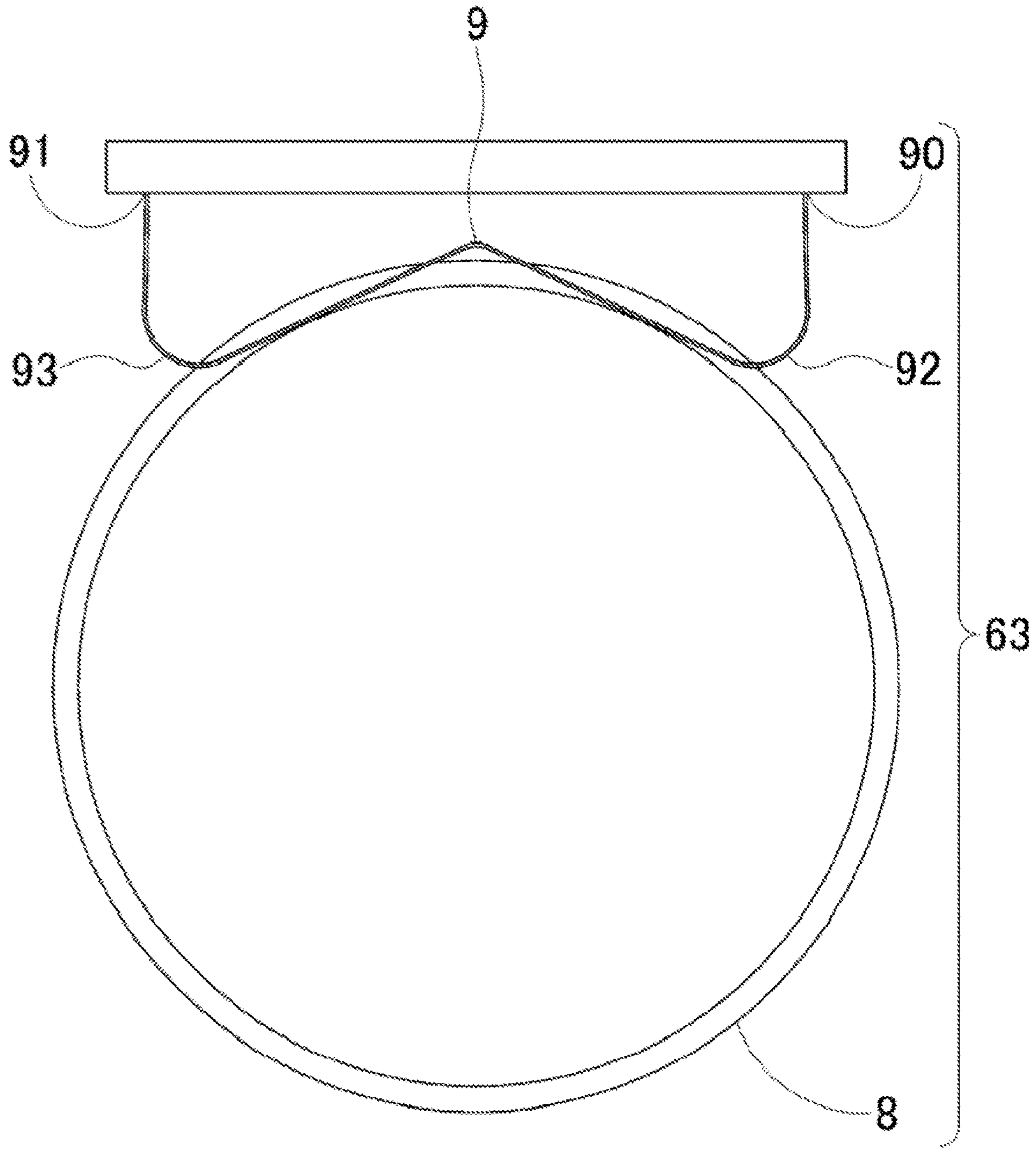
FIG. 6 is a cross-sectional view of a rotating electrode of FIG. 5.

FIG. 5 is an overall cross-sectional view of a torque tester 6. FIG. 6 is a cross-sectional view of a rotating electrode 8 of FIG. 5.

The torque tester 6 is retrofitted to the impact fastening tool 1 or used to test the impact fastening tool 1, and is configured to measure the tightening torque with which the impact fastening tool 1 fastens a screw. The torque tester 6 can also measure the tightening torque of a nut runner, for example, that generates torque continuously. As shown in FIG. 5, the torque tester 6 includes a housing 60, a shaft receiving portion 61, a main shaft 62, a slip ring portion 63, and a torque detection means 7.

The shaft receiving portion 61 is connected by receiving the shaft end portion 23 of the impact fastening tool 1 shown in FIG. 1, for example. This allows the main shaft 62 of the torque tester 6 to rotate in synchronization with the main shaft 22 of the impact fastening tool 1.

The torque tester 6 illustrated in FIG. 6 is retrofitted to check torque while fastening screws and the like. Both ends of the main shaft 62 penetrate the housing 60.

[6. Torque Detection Means 7 and Slip Ring Portion 63]

The torque detection means 7 is configured to detect the tightening torque of a fastening tool (e.g., impact fastening tool 1 and nut runner) connected to the shaft receiving portion 61, and the torque tester 6 outputs a measured value of the torque of the connected fastening tool, on the basis of the detection.

The slip ring portion 63 including the rotating electrode 8 and a fixed connector 9 shown in FIG. 6 transmits a signal required for the torque detection means 7.

To enable transmission of a signal as mentioned above, the rotating electrode 8 is provided on the outer periphery of the main shaft 62 and rotates integrally with the main shaft 62, while the fixed connector 9 is fixed to the non-rotary housing 60 side and is in contact with the rotating electrode 8, as shown in FIGS. 5 and 6. Hence, a signal required for the torque detection means 7 can be transmitted through the contact between the rotating electrode 8 and the fixed connector 9.

Signal transmission of the torque detection means 7 will be described in more detail. As shown in FIG. 5, a strain gauge 70 is attached to the main shaft 62. A signal from the strain gauge 70 is transmitted by passing through wiring 71 from the strain gauge 70 to the rotating electrode 8, through the contact between the rotating electrode 8 and the fixed connector 9, and through wiring 72 on the housing 60 side. Then, the torque detection means 7 detects torque on the basis of the transmitted signal. It is preferable that the signal be transmitted from the strain gauge 70 to the housing 60 side by using DC. This is because if AC is used for torque detection, a circuit for rectifying AC to DC is required, and a circuit for detecting the phase difference between input and output is required to detect right and left of the rotation direction. On the other hand, since DC does not require rectification, and right and left of the rotation direction can be detected by voltage level alone, the circuit can be simplified. As a result, by detecting torque by a DC circuit, the torque tester 6 can be reduced in size and weight.

[7. Rotating Electrode 8 and Fixed Connector 9]

As shown in FIG. 5, the rotating electrode 8 includes multiple grooves 80, 81, 82, and 83, and each of the grooves 80 to 83 is in contact with the fixed connector 9, as in the case of the rotating electrode 4 of Embodiment 1.

Also, as shown in FIG. 6, both end portions 90, 91 of the fixed connector 9 are fixed, and at least two protrusion portions 92, 93 are formed between the both end portions 90, 91, as in the case of the fixed connector 5 of Embodiment 1. Hence, the rotating electrode 8 is disposed between one protrusion portion 92 and the other protrusion portion 93 such that the rotating electrode 8 contacts the fixed connector 9 at two or more points or in a line form.

Other configurations, effects and advantages of Embodiment 2 are the same as Embodiment 1.

INDUSTRIAL APPLICABILITY

The present invention relates to connection between the rotating electrode 4 and the fixed connector 5, and between the rotating electrode 8 and the fixed connector 9, which addresses the characteristic problem of the impact fastening tool 1 and the torque tester 6 that abrupt vibration is caused by looseness of a socket or impact when fastening, for example. Hence, the invention is applicable not only to the impact fastening tool 1, but also to tools, devices, and other equipment that have similar problems.

REFERENCE SIGNS LIST

1 impact fastening tool
10 housing
11 trigger
12 slip ring portion
2 rotating portion
20 rotary drive source
21 impact generation mechanism
22 main shaft
23 shaft end portion
3 torque detection means
30 strain gauge
31 wiring

32 wiring
4 rotating electrode
40 groove
41 groove
42 groove
43 groove
5 fixed connector
50 end portion
51 end portion
52 protrusion portion
53 protrusion portion
54 valley portion
6 torque tester
60 housing
61 shaft receiving portion
62 main shaft
63 slip ring portion
7 torque detection means
70 strain gauge
71 wiring
72 wiring
8 rotating electrode
80 groove
81 groove
82 groove
83 groove
9 fixed connector
90 end portion
91 end portion
92 protrusion portion
93 protrusion portion
B brush
F force

The invention claimed is:

1. An impact fastening tool for converting a rotary force of a rotary drive source into intermittent impacts by an impact generation mechanism, and fastening a screw by a rotary force of a main shaft applied by impact force, the impact fastening tool comprising:

a housing;

a slip ring portion; and a torque detection means that detects a tightening torque, wherein:

the slip ring portion includes a rotating electrode that rotates integrally with the main shaft, and a fixed connector that is in contact with the rotating electrode;

both end portions of the fixed connector are fixed, and at least two protrusion portions are formed between both end portions;

a part between a top of one protrusion portion and a top of the other protrusion portion comprises an indented valley portion, and a curvature of the indented valley portion is smaller than a curvature of the rotating electrode;

the rotating electrode is disposed between one protrusion portion and the other protrusion portion such that the rotating electrode contacts the fixed connector, at least, at two contact points; and a signal required for the torque detection means is transmitted through the slip ring portion.

2. A torque tester for measuring a tightening torque of a fastening tool, comprising:

a housing;

a shaft receiving portion that receives a main shaft of the fastening tool;

a slip ring portion; and a torque detection means that detects a tightening torque, wherein:

the slip ring portion includes a rotating electrode that rotates integrally with the shaft receiving portion, and a fixed connector that is fixed and in contact with the rotating electrode;

both end portions of the fixed connector are fixed, and at least two protrusion portions are formed between the both end portions;

a part between a top of one protrusion portion and a top of the other protrusion portion comprises an indented valley portion, and a curvature of the indented valley portion is smaller than a curvature of the rotating electrode;

the rotating electrode is disposed between one protrusion portion and the other protrusion portion such that the rotating electrode contacts the fixed connector, at least, at least, at two contact points; and a signal required for the torque detection means is transmitted through the slip ring portion.

* * * * *